United States Patent

Darwin

[15] 3,652,990

[45] Mar. 28, 1972

[54] APPARATUS FOR THE RECOGNITION OR ANALYSIS OF PATTERNS

[72] Inventor: George Pember Darwin, London, England

[73] Assignee: International Computers Limited, London, England

[22] Filed: Feb. 17, 1970

[21] Appl. No.: 12,066

[30] Foreign Application Priority Data

Feb. 25, 1969 Great Britain ......................10,025/69

[52] U.S. Cl. ......................................................340/146.3AC
[51] Int. Cl. .........................................................G06k 9/12
[58] Field of Search ..............................................340/146.3

[56] References Cited

UNITED STATES PATENTS 3,050,711 8/1962 Harmon.............................340/146.3

*Primary Examiner*—Maynard R. Wilbur
*Assistant Examiner*—Leo H. Boudreau
*Attorney*—Hane, Baxley & Spiecens

[57] ABSTRACT

Data processing apparatus for the recognition or analysis of patterns, which may, for example, be character representations requires that the pattern to be processed be divided into elementary areas arranged in a matrix. The matrix of areas is scanned by a corresponding matrix of detecting elements, such as photocells, and the resultant signals are applied as inputs to a plurality of logic units. Each logic unit is, for example, primarily associated with a specific elementary area of the pattern but connections are also provided to the unit from those detecting elements scanning other pattern areas having a particular positional relationship to the primarily associated one. These other pattern areas are typically those immediately surrounding the primarily associated one. A standard timing waveform is applied to the logic units and is modified according to the states of and positional relationships of the pattern areas whose detectors are connected to the logic unit, so that the output of the logic unit has a time relationship to the standard timing waveform which is dependent on these positions and states. For example, the areas with which a logic unit is associated may produce varying delays to the standard waveform and the various waveforms derived in this way may again be recombined. Typically, the states of the areas may produce a half-cycle delay in the waveform and the positional differences of the various areas may produce appropriate phase delays in the waveform. The resultant output waveform may be that made to indicate such features of the pattern as it is desired to recognize, such as, for example, the direction of a line, or the existence of a curve or junction in the line.

9 Claims, 6 Drawing Figures

INVENTOR
GEORGE PEMBER DARWIN
By Hane, Baxley and Spiecens
ATTORNEYS

APPARATUS FOR THE RECOGNITION OR ANALYSIS OF PATTERNS

BACKGROUND OF THE INVENTION

1. Field of the Invention

This invention relates to the processing of data which represents patterns.

2. Description of the Prior Art

The majority of data processing systems for the recognition of patterns may be regarded as carrying out three operations:

i. Generating electrical signals which represent the pattern to be recognized;

ii. Analyzing the signals to determine properties of the pattern which they represent;

iii. Determining from the properties which particular pattern is being dealt with.

The first operation may be carried out by optical projection of a whole area, in which the pattern is included, on to a matrix of photoelectric cells, so that each cell scans only a discrete elementary area within the whole area. Alternatively, the whole area may be scanned by a raster. The waveform produced during each line scan of the raster may be sampled at intervals, so that, again, the whole area is effectively divided into a matrix of smaller elementary areas. The signal from each elementary area is usually quantised on a binary basis, so that is, for example, the pattern is a black character on a white ground, the signal for each such area may then be regarded as representing either black or white.

One method of carrying out the second operation is to examine the signals corresponding to groups of the elementary areas of the pattern to determine the presence within the pattern of particular features, such as horizontal and vertical lines, curved lines with particular directions of curvature, and intersections of lines. For example, to greatly simplify the problem, if a number of adjacent areas in a column of the matrix have black signals, then the pattern can be assumed to contain a vertical line; if a number of adjacent areas in a row of the matrix have black signals, then the pattern contains a horizontal line. Particularly in the case of printed patterns, such as characters, the patterns often have imperfections which are comparable in size with the elementary areas of the scanning matrix. These imperfections may result from flaws in the surface on which the pattern is printed; from variations in inking, etc. Such an imperfection may affect the boundary of the pattern, resulting in an irregularity in the smooth outline.

Various proposals have been made for pre-processing the raw data from the pattern reading operation to remove, partially at least, these imperfections. For example, the pre-processing may even out irregularities in the outline and remove isolated marks which are not part of the pattern. Such pre-processing may be valuable for a variety of analyzing and recognition systems. However, there are many similarities in the manner in which the data is treated for pre-processing and for feature recognition.

U.S. Pat. No. 3,106,699 describes a data processing system which may be adopted for use in pre-processing, or in feature recognition. The system employs a multiplicity of threshold logic elements, each corresponding to a particular elementary matrix area. Each logic element receives a data input from the particular elementary area to which it is primarily related, and also from other elementary areas adjacent to that particular primarily related area. By setting the response level of the threshold element and selecting the significance of the various inputs, the threshold element may be made to provide an output signal only when a particular configuration of the matrix areas exist. Thus, in order to detect other configurations it is necessary to provide either further sets of logic elements, or a program arrangement which modifies the setting and the inputs of the individual threshold elements in some desired sequence.

SUMMARY OF THE INVENTION

According to the invention data pattern processing apparatus includes a plurality of data element input devices arranged in matrix formation to scan a data pattern, each device respectively scanning a different elementary area of the pattern to produce an input signal representative of the data significance of that area, a plurality of logic units connected to receive the input signals from the input devices, a timing waveform source connected to the logic units, a logic unit being responsive to input signals and to the timing waveform to produce an output signal having a timing dependent upon the relative significances and positions of more than one of the elementary areas.

DESCRIPTION OF PREFERRED EMBODIMENT

Figure 1:
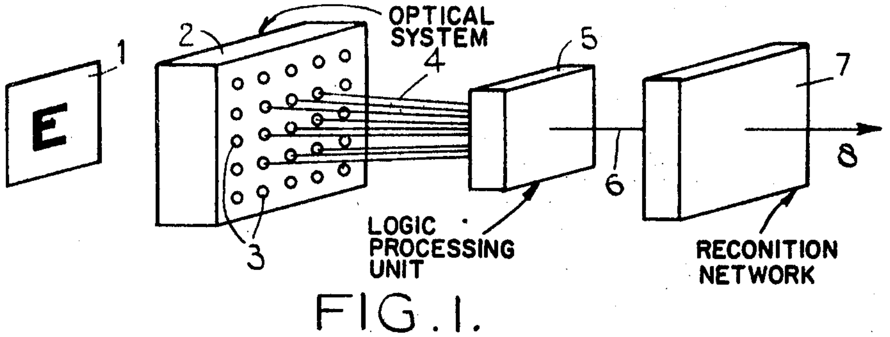
FIG. 1 is a schematic diagram of a pattern recognition system.

FIG. 1 shows a pattern recognition system in a generalized form. A printed character E' on a document 1 is scanned by a conventional optical system 2. The optical system 2 includes photoelectric cells arranged in matrix formation to provide data signal outputs 3. The signal present on a particular signal output 3 represents the optical reflectivity of a corresponding small, or elementary, area of the surface of the document 1. The signal provided at the signal output 3 may be in analogue form, e.g., in which the amplitude of the signal is proportional to the reflectivity, or in digitized form, e.g., in which the amplitude of the signal has one of two predetermined values which represent black and white, respectively.

The signals from the data signal outputs 3 are applied over lines 4 to logic processing units 5, of which only one is shown for the sake of clarity. The output signals from each logic processing unit 5 is applied over a line 6 to a recognition network 7, which provides an output at 8 to indicate which character of the recognizable set of characters has been scanned by the system 2.

Figure 2A:
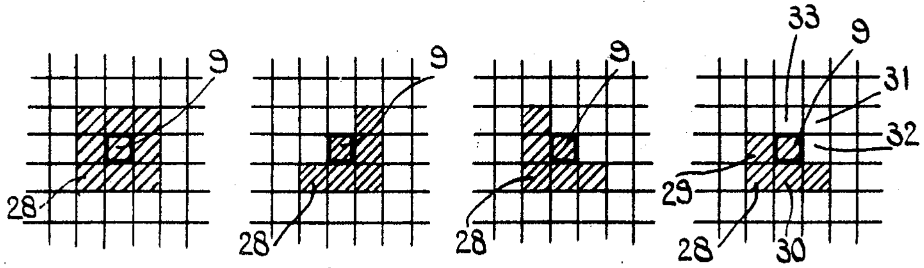
FIGS. 2*a*, *b*, *c* and *d* illustrate certain combinations of data states in a matrix.

FIG. 2*a* may be considered as showing part of the matrix of elementary areas into which the surface of the document 1 is effectively divided by the operation of the scanner system 2. If the output signals from the scanner are quantized simply to a black or white level, FIG. 2*a* may also be considered as showing the states of part of the matrix of data outputs 3. The elementary areas which are black on the document, or represent black signals from the outputs 3, are shaded. The pattern will be considered in relation to a particular elementary area 9.

As shown, the area 9 is black, and it is completely surrounded by other elementary areas, which, as shown, are also black, that is, the adjacent areas in both the perpendicular and diagonal directions are black. This pattern may be defined as being angle-independent, in that rotation of the pattern about an axis centered on the area 9 does not change the relationship between the area 9 and the adjacent areas.

It will be realized that other patterns, for example, those shown in FIGS. 2*b* and 2*c*, may be angle-dependent in that the pattern is altered by rotation. It will be apparent, for example, that the pattern of FIG. 2*c* may be obtained by rotating the pattern of FIG. 2*b* through 90° in a clock-wise direction.

The system described in U.S. Pat. No. 3,106,699, referred to earlier, could be used to detect the pattern of FIG. 2*b*, for example. However, it would then reject the pattern of FIG. 2*c*. Nevertheless, there is obviously a close connection between the patterns of these two figures, since one pattern can be produced by rotation of the other pattern. If one considers the four patterns which result from repeated rotations through 90° of the pattern of FIG. 2*b*, the common feature of the patterns is that they represent an inclined straight boundary line. There are other patterns corresponding to an inclined boundary, but these four patterns provide a convenient example. The ability to recognize any pattern of a set of patterns which have a common feature, as opposed to recognizing a particular pattern, is of considerable value in pre-processing and feature recognition operations.

The essential feature of the logic unit 5, which enables it to recognize any pattern of a set, is that the signals from the data outputs 3 are handled serially within the logic unit in such a way that it may make several different recognition comparisons during one cycle of operation.

Figure 3:
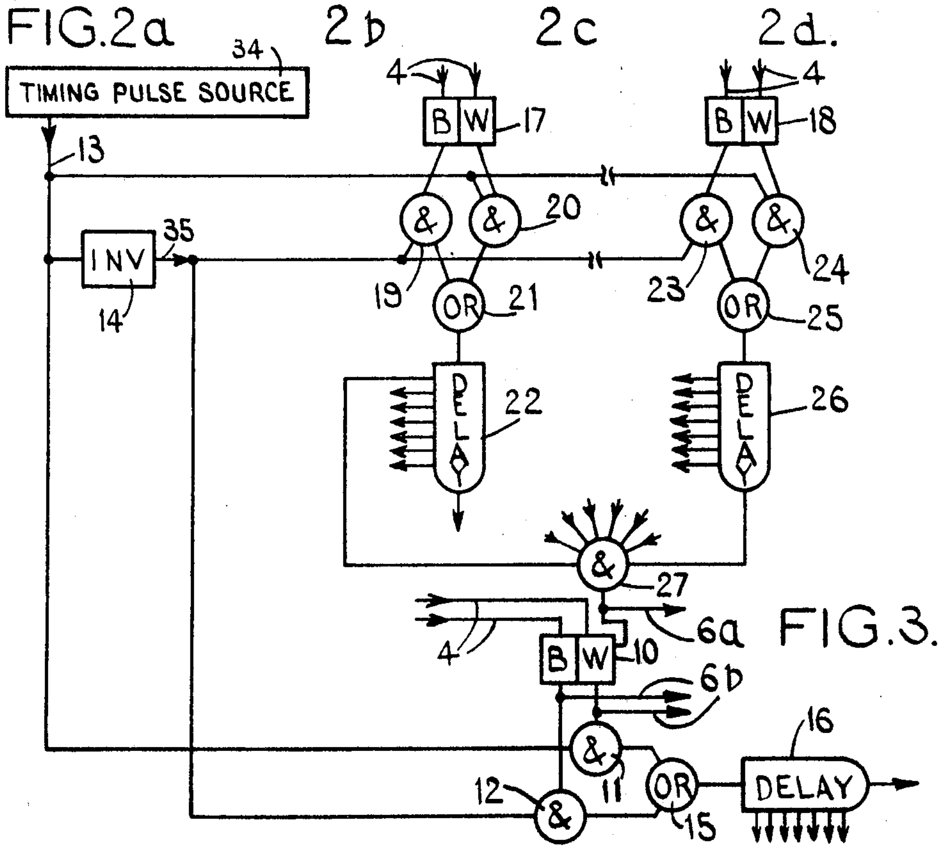
FIG. 3 is a schematic diagram of one form of logic unit.

One form of logic unit is shown in schematic form in FIG. 3. The signals from the output 3 (FIG. 1) which correspond to the elementary area 9 (FIG. 2), are applied over the lines 4 to control a bistable device 10. The bistable 10 will be set to one state by the signals if the area 9 is white, and to the opposite state if the area 9 is black. The bistable 10 controls a pair of AND gates 11 and 12.

A timing waveform source 34 is arranged to generate a cyclic waveform and this waveform is applied to a supply line 13. The supply line 13 is connected to an inverter stage 14, which inverts the timing waveform and applies the inverted waveform to a further supply line 35. The supply lines 13 and 35 are respectively connected to the AND gates 11 and 12.

Thus, if the bistable 10 is set to indicate that the area 9 is white, the AND gate 11 is opened to permit the timing waveform from the line 13 to pass; whereas if the setting of the bistable 10 indicates that the area 9 is black, the AND gate 12 is opened and the inverted timing signal from the line 35 is permitted to pass. The waveforms passed by the AND gates 11 and 12 are applied through an OR gate 15 to a delay network 16. Hence, the delay network receives either the unchanged timing waveform or the inverted timing waveform, which is equivalent to the timing waveform subjected to a phase shift of 180°, in dependence upon the state of the area 9.

The delay network 16 has a number of outputs, each of which is associated with a different delay time. In the present case, the delay times are such that the first output provides a phase shift of 45° in relation to the input signal, the second output provides a phase shift of 90°, and so on. Thus, the phase of the signal at any delay output, relative to the timing waveform on the line 13, is determined jointly by the delay time associated with that particular output and the state of the bistable 10.

The signals from the data outputs 3, corresponding to the eight areas surrounding the area 9, are applied to eight other bistables, of which only two, referenced 17 and 18, are, for the sake of clarity, shown in FIG. 3. The bistable 17 controls a pair of AND gates 19 and 20, the outputs of which are connected through OR gate 21 to the input of delay network 22. Similarly, the bistable 18 controls a pair of AND gates 23 and 24, whose outputs are connected through OR gate 25 to the input of delay network 26. It will be appreciated that the circuit of a bistable with its associated gates and a delay network is similar for each of the surrounding areas, and is similar also to the circuit which has already been described in relation to the bistable 10, the gates 11, 12 and 15 and the delay network 16.

A different output of each of the eight delay networks is connected to an AND gate 27. For example, the first output of the network 22, and the last output of the network 26, are connected to the gate 27. Thus, the input to the AND gate 27, from the delay network associated with each of the other eight elementary areas surrounding the area 9 depends upon both the state of the associated area and the position of that area relative to the area 9.

It will be understood that the logic unit shown in FIG. 3 deals with the relationship between the particular area 9 and the immediately adjacent surrounding areas. Accordingly, a large number of similar logic units are provided in practice, each of which is primarily associated with a particular area in the way that the logic unit shown is primarily associated with the area 9. The different outputs of each delay network of these logic units are connected to AND gates, corresponding to gate 27 shown, which are connected to the bistables respectively associated with those other areas with which the particular logic units are primarily associated. For example, the area 28 is in the left-hand lower diagonal position relative to the area 9, and conversely, the area 9 is in the right-hand upper diagonal position relative to the area 28. If the bistable 17 corresponds to the area 28 and the outputs of each delay network are sequentially related to the positions occupied by the other areas around a central area, then the fifth output of the delay network 16 will be connected to an AND gate (not shown) corresponding to the AND gate 27 in function which is connected to the bistable 17.

The delay phase angles of the inputs to the gate 27, relative to the scan waveform, for the pattern of FIG. 2*b*, may be as set out below, starting with the input corresponding with the area 28 and listing the areas in clockwise sequence about the area 9:

$$0° + 180° = 180°$$
$$45° + 0° = 45°$$
$$90° + 0° = 90°$$
$$135° + 0° = 135°$$
$$180° + 180° = 0°$$
$$225° + 180° = 45°$$
$$270° + 180° = 90°$$
$$315° + 180° = 135°$$

It is to be noted that the first angle refers to the angular position of the area about the area 9, measured from the area 28, which provides a datum position, the second angle is an indication of the state of the area concerned and the third angle is the resultant phase delay, corrected by the subtraction of 360° from any total which exceeds this figure, because the timing waveform is cyclically repetitive.

The corresponding list of phase angles for the pattern of FIG. 2*c* are:

$$0° + 180° = 180°$$
$$45° + 180° = 225°$$
$$90° + 180° = 270°$$
$$135° + 0° = 135°$$
$$180° + 0° = 180°$$
$$225° + 0° = 225°$$
$$270° + 180° = 90°$$
$$315° + 180° = 135°$$

It has already been noted that the pattern of FIG. 2*c* may be obtained by rotating the pattern of FIG. 2*b* through 90°. It will now be seen that the two sets of phase angles above are related in the same way, that is, the set of phase angles for FIG. 2*c* can be obtained by adding 90° to the phase angles for FIG. 2*b*. The sets of phase angles for those other patterns which are obtainable by rotating the pattern of FIG. 2*b* through other angles are similarly related to the angle of rotation of the pattern. Thus, the composite waveforms produced by such variation in the orientation of the patterns are the same except for a relative phase shift.

The logic unit may be arranged to operate with various forms of cyclic timing waveform, such as a sine wave, a quantised sine wave or a square wave. For example, if the timing waveform is a square wave with a 1:1 mark/space ratio, the pattern of FIG. 2*b* will result in seven inputs of the AND gate 27 having a particular polarity between 135° and 225°. Thus, if the gate 27 is made as a 7 out of 8 majority logic gate, it will provide an output on the occurrence of the pattern of FIG. 2*b*. The other patterns, produced by rotation of the pattern of FIG. 2*b*, will also produce the same 7 out of 8 condition at different times during the cycle of the scan waveform. Consequently, the gate 27 will produce an output during an operating cycle when any of these patterns are scanned.

The output of the gate 27 may be fed over line 6*a* directly to the recognition unit 7. The output may also be fed to the bistable 10, and the output from the bistable 10 may then be fed over lines 6*b* to the recognition unit 7. By connecting the output of the gate 27 to the bistable 10, it is possible to correct the setting of the bistable 10 to take account of a minor imperfection in the pattern. The setting of the bistable 10 may then be modified in accordance with the state of the elementary pattern areas surrounding that area 9 with which the bistable 10 is primarily associated. As an example of the correction that is possible, suppose that a minor imperfection in the pattern results in the area 9 being white instead of black. The output from the gate 27 may then be connected, as indicated schematically in FIG. 3, to a part of the circuit of the bistable so that it is effective to cause the bistable to be forcibly set to indicate black. Thenceforward, on successive cycles of the timing waveform the area 9 will be treated as black for the subsequent analysis of the pattern, and in this way the imperfection in the pattern is corrected so far as the recognition unit 7 input is concerned.

If a sine wave is used as the timing waveform, the gate 27 is preferably made a threshold logic element with an adjustable threshold. The mode of operation is otherwise essentially the same as described above for the square wave timing waveform. However, the logic unit is then essentially analogue, rather than digital, and this has advantages in certain applications, in so far as the quantizing inherent in digital operation reduces the amount of information which is retained in the system.

Such an analogue system has a further potential advantage in that it is simpler to arrange that the output of some elementary pattern areas should be less effective in determining the final output. For example, for the purposes of pattern recognition, it may be decided that not only should the patterns of FIG. 2*b* and 2*c* be regarded as defining a black/white straightline boundary, but that a pattern such as that of FIG. 2*d* should also be so regarded. This may be achieved, for example, by specifying that to qualify for such recognition, the areas such as 28, 29 and 30 must be black, that the areas such as 33, 31 and 32 must be white, and that the state of the remaining two areas adjacent to the area 9 may be either black or white. This requirement could be implemented for the pattern of FIG. 2*d* using a digital system by connecting only the six positively specified inputs to the gate 27 and modifying the gate to operate with fewer inputs. In the case of an analogue system, however, the gate 27 may remain in the standard form as an eight input gate, and the phasing of the signals from the unspecified areas is then so arranged that they make only a small contribution to the output from the gate 27 which is thus principally generated by the signals from the specified areas.

An alternative way of dealing with unspecified areas in the digital system is to apply an additional waveform to the OR gates, such as 21 and 25 (FIG. 3), so that the unspecified areas provide, say, a white output irrespective of the actual setting of the associated bistable.

A hybrid system may be provided by using a quantized sine wave as the timing waveform. In addition, the inputs to the gate 27 may be weighted. This allows a threshold logic circuit to be used for the gate 27, whilst retaining a digitized timing waveform.

It will be apparent that the arrangement shown in FIG. 3 requires a large number of delay networks for a complete system. An alternative arrangement utilizes a single delay network as a master source of the eight possible phases of the scan waveform, in the same way that a single inverter 14 provides the 180° phase-delayed waveform. In this case, of course, each bistable controls a set of gates to provide the appropriately phased outputs which are shown in FIG. 3 as obtained from the delay networks 16, 22 and 26.

The embodiment described above relates to states of all those other elementary areas surrounding a particular area. This is a convenient arrangement in practice, but it will be appreciated that the arrangement may be modified to take into account a smaller, or larger, number of areas. Furthermore, it may be modified to use a different point of reference, such as the corners of a reference area instead of the center of that area. Thus, for example, in such a case, each logic unit would deal with the states of the four elementary areas which have a common corner.

I claim:

1. Data pattern recognition apparatus including: a plurality of data element input devices arranged in matrix form to scan a data pattern each said device respectively scanning a different elementary area of the pattern to produce a first input signal representative of the data significance of the elementary area; a plurality of first logic units each connected to a data input device; a timing waveform source; means associated with each first logic unit, for modifying the timing waveform firstly according to the data significance of its associated elementary pattern area and secondly for producing a plurality of further input signals time delayed with respect to the modified waveform by predetermined increments, a plurality of second logic units each connected to receive a predetermined number of said further inputs one from each of a selected group of first logic units of which one is associated with a particular elementary pattern area and the remainder with other elementary pattern areas occupying predetermined positional relationship to the particular elementary pattern area, each second logic unit being operative to produce an output characteristic of the data significance of the associated group; and means for producing from said outputs an indication of the pattern to be recognized.

2. Apparatus as claimed in claim 1, in which the modifying means is operable in response to said first input signals to apply a first predetermined delay to said timing waveform in dependence upon the data significant of the associated elementary pattern area and a second delay which is variable by predetermined increments according to the position of one elementary pattern area relative to another.

3. Apparatus as claimed in claim 2, in which the timing waveform is cyclic; in which the data significance of an elementary pattern area is represented as one of two opposite states and in which said first predetermined delay is zero if the area is in one state and is a half-cycle delay if the area is in the opposite state.

4. Apparatus as claimed in claim 3, in which said other elementary pattern areas are respectively disposed around said particular elementary pattern area, the positions of said other elementary pattern areas respectively being expressed as an angular displacement from a predetermined datum of said other elementary pattern areas about said particular elementary pattern area, and in which said modifying means produces the second delay by a phase displacement of said timing waveform by increments to the respective angular displacement.

5. Apparatus as claimed in claim 4, in which the modifying means includes means for inverting said timing waveform to produce said half-cycle delay.

6. Apparatus as claimed in claim 5 in which each data element input device produces a signal with two components each characteristic of a particular data state of the associative elementary pattern area and in which each first logic unit includes means responsive to input signal components respectively to register the state of an associated elementary pattern area; gating means connected to each of the registering means and a first output line connected with the modifying means for each separate registering means respectively, said gating means being operable to permit said timing waveform to pass unchanged to the first output line if the associated elementary pattern area is in said one state and being operable to permit only the inverting timing waveform to pass to the first output line if the associated elementary pattern area is in the second state.

7. Apparatus as claimed in claim 6 in which the modifying means includes a separate delay device respectively connected to each of said first output lines associated respectively with said other elementary pattern areas respectively arranged to produce said phase displacement at said timing waveform.

8. Apparatus as claimed in claim 7 in which each said registering means is a bistable element settable to a first stable state if the associated elementary pattern area is in said one state and to a second stable state if the associated elementary pattern area is in said opposite state.

9. Apparatus as claimed in claim 8 in which said first output lines associated respectively with said other elementary pattern areas are connected to said bistable element associated with said particular elementary pattern area, said bistable element associated with said particular elementary pattern area being responsive to delayed waveforms on the connected lines to switch to the opposite stable state from that to which it had previously been set in response to an input signal.

* * * * *